United States Patent Office 3,523,147
Patented Aug. 4, 1970

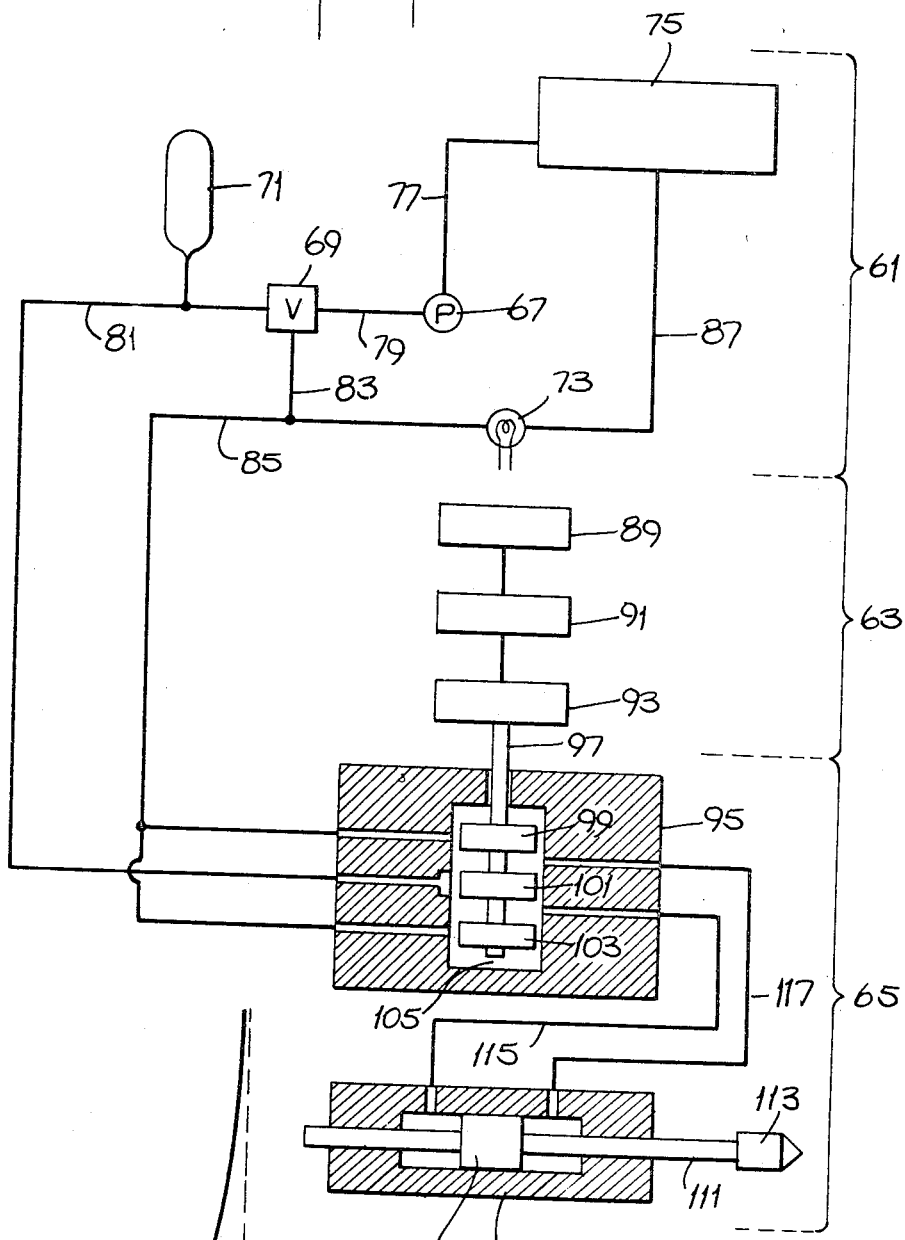

3,523,147
PLASTICATION OF THERMOPLASTIC MATERIALS
Peter Hold, Milford, Dominic A. D'Amato, Cheshire, and Dario J. Ramazzotti, Huntington, Conn., assignors, by mesne assignments, to USM Corporation, Boston, Mass., a corporation of New Jersey
Filed Sept. 28, 1967, Ser. No. 671,407
Int. Cl. B06b 3/00; B29b 1/04
U.S. Cl. 264—23                                    12 Claims

ABSTRACT OF THE DISCLOSURE

Plastication of thermoplastic materials is effected by applying to the thermoplastic material a rapidly fluctuating pressure sufficient to cause reversible elastic deformation of the thermoplastic material and thereby heat the material.

---

The present invention is concerned with the plastication of thermoplastic materials. More particularly, this invention relates to effecting plastication wherein the requisite heat is generated by reversible elastic deformation of a thermoplastic material.

A continuing problem encountered in the molding of thermoplastic materials is that of plastication, i.e., the uniform conversion of cold, granular, thermoplastic feed into a homogenous heated melt of controlled viscosity. This operation is complicated because of the low thermal conductivities of the thermoplastic materials and the highly viscous nature of the molten material coupled with the importance of achieving high material throughput.

Initially, plastication was effected by passing solid, thermoplastic material through an externally heated tube. Considerable effort has been expended in an effort to improve the heat transfer characteristics of the tube, such as by inserting torpedoes, melt extractors and the like in the tube to provide thin cross-sections of the thermoplastic material. In addition, various forms of screw conveyors have been employed both to provide thin cross-sections as well as to promote mixing of the thermoplastic material. More recently, it was discovered that the screw can be so designed that shearing of the thermoplastic material can supply substantially all of the heat requirements for some types of plastication, which led to the development of plasticators wherein the thermoplastic material is sheared between rotating disks.

These previous forms of plasticators suffer from one or more disadvantages. Thus plasticators employing external heaters, in addition to the expected heat losses, generally suffer from poor heat transfer to the thermoplastic material. Although the latter problem has been alleviated, at least in part, by torpedoes and the like, the resulting device becomes more complicated and difficult to clean and the power required to force the thermoplastic material through the plasticator is increased. The shear-type plasticators, although requiring little or no external heat during operation, ordinarily require additional heat for start-up. Moreover, in the screw devices heat input due to shear is not readily varied without changing the discharge rate of the device or replacing the screw. Finally, many thermoplastic materials are sensitive to shear degradation, and thus cannot be processed in shear devices.

It is an object of this invention to provide a means for the plastication of thermoplastic materials which does not require an external source of heat.

It is another object of this invention to provide a means for the plastication of thermoplastic materials which does not require complex internal structures.

Still another object of this invention is to provide a means whereby plastication of thermoplastic materials is effected by mechanical working of the material and wherein the heat input rate is substantially independent of the throughput of the thermoplastic material.

A still further object of this invention is to provide a means for the plastication of thermoplastic materials by mechanical working of the material while minimizing the shearing of the thermoplastic material.

These and other objects, which will be apparent from the ensuing specification and appended drawings and claims, are achieved by subjecting particulate thermoplastic material to a static pressure sufficient to provide close contact of the solid particles and a relatively rapidly fluctuating pressure sufficient to cause reversible elastic deformation of the thermoplastic material. Because of the phenomenon of hysteresis, the mechanical energy is converted into heat, thereby effecting plastication of the thermoplastic material.

Plastication in accordance with this invention is effected in an apparatus comprising a chamber having an inlet for particulate solid thermoplastic material, an outlet for plasticated thermoplastic material, means for applying a static pressure to the thermoplastic material, means for applying a fluctuating pressure to the thermoplastic material, means to charge solid particulate thermoplastic material to the chamber, and means to discharge plasticated thermoplastic material from the chamber.

This apparatus can take any of several forms, of which the drawings are illustrative, and of which:

FIG. 4 is a graph of pressure as a function of piston deflection during the compression of solid particulate thermoplastic material; and FIG. 5 is a schematic drawing, partly in cross-section, of a hydraulic system which is useful for applying the fluctuating pressure in accordance with this invention.

Figure 1:
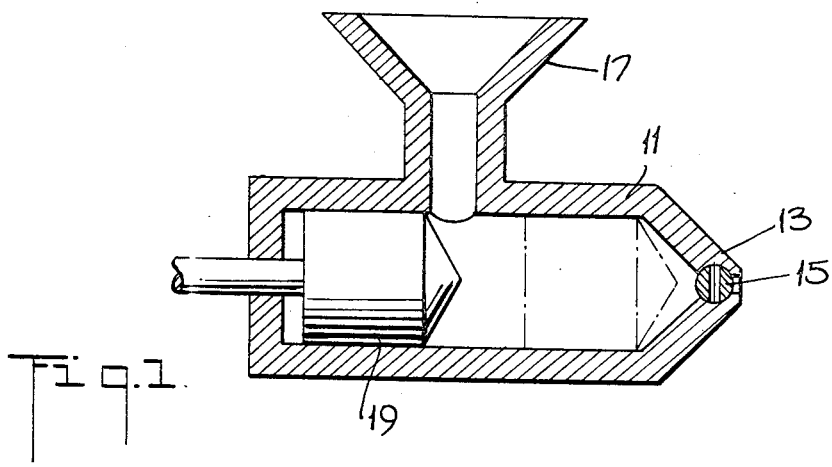
FIG. 1 is a schematic, cross-sectional drawing of one embodiment of a plasticator in accordance with this invention.

In its simplest embodiment the plasticator of this invention, as shown in FIG. 1, comprises cylinder 11 having at one end nozzle 13, equipped if desired with valve 15, and spaced from nozzle 13, hopper 17. Piston 19, which reciprocates in cylinder 11, is employed to provide both the static and the fluctuating pressures, as hereinafter described. In operation, with piston 19 withdrawn to the position shown and valve 15 closed, solid particulate thermoplastic material is charged to cylinder 11 from hopper 17. Piston 19 is then actuated to apply a selected static pressure and simultaneously is reciprocally vibrated to superimpose a fluctuating pressure on the applied static pressure for a period of time sufficient to heat and fuse a thermoplastic material contained in cylinder 11. Valve 15 is then opened and piston 19 is forced completely to the position shown in dotted lines, thereby ejecting molten thermoplastic material through nozzle 13.

Figure 2:
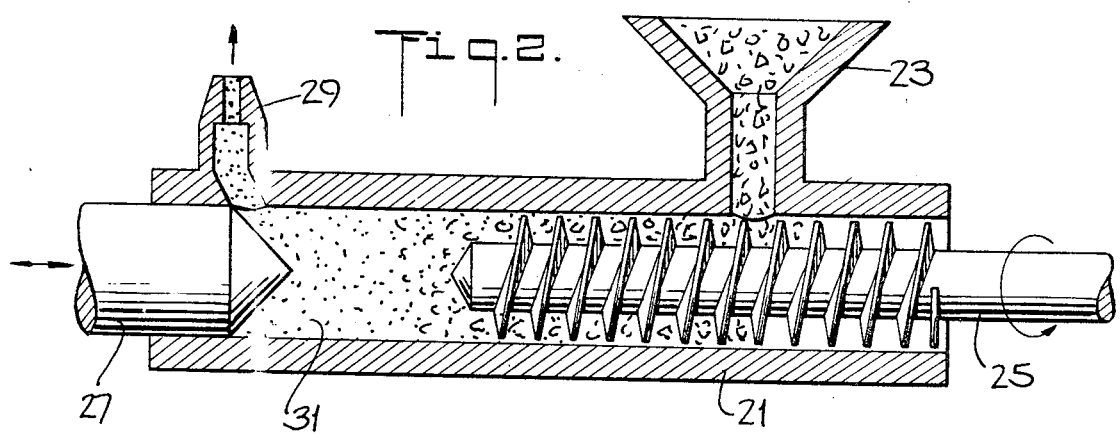
FIG. 2 is a schematic, cross-sectional drawing of a second embodiment of a plasticator in accordance with this invention which is particularly useful for continuous plastication.

In an alternative device as shown in FIG. 2, which is useful for more rapid operation, and particularly for continuous extrusion, there is employed cylinder 21 having at one end thereof hopper 23 and feed and pre-load screw 25, and at the other end vibrating piston 27 and nozzle 29. In continuous operation screw 25 conveys solid thermoplastic material from hopper 23 to plastication zone 31 adjacent vibrating piston 27. The rate of travel of screw 25 is set to provide the requisite static pressure in plastication zone 31 and to provide the motive force for ejection of molten thermoplastic material through nozzle 29. This embodiment may be readily adapted for cyclic operation by employing a reciprocating screw in a manner similar to the known reciprocating screw plasticators. In this form, however, the screw conveyor should be so designed as to minimize heating effects due to shear of the thermoplastic material.

Figure 3:
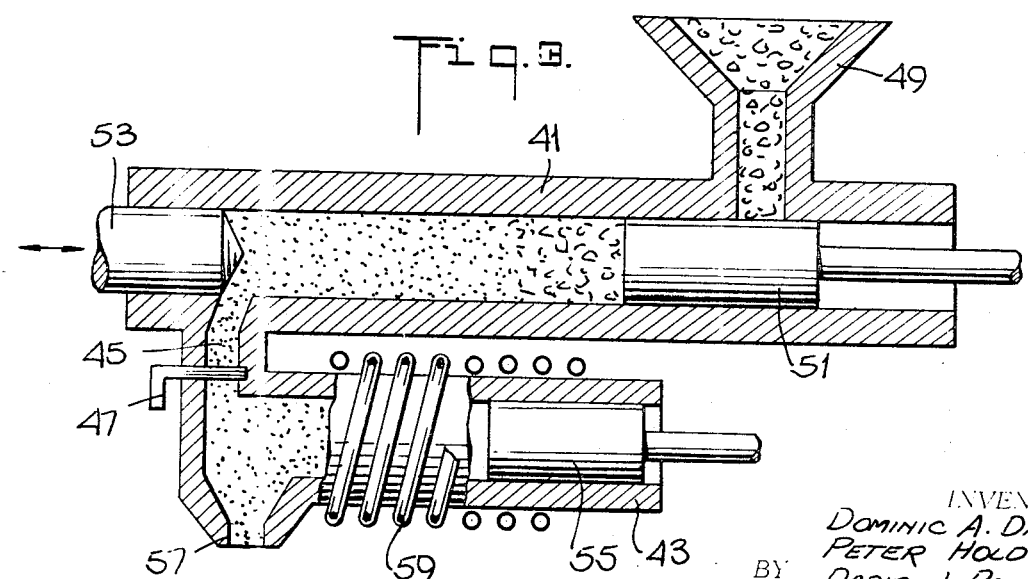
FIG. 3 is a schematic, cross-sectional drawing of a third embodiment in accordance with this invention which is suited for use for injection molding of large masses.

Still a further embodiment which is especially suited for injection molding of large masses is shown in FIG. 3. In this embodiment plastication cylinder 41 and storage cylinder 43 are connected through valved line 45, having valve 47, which serves as the outlet from plastication cylinder 41 and the inlet for storage cylinder 43. Cylinder 41 is equipped with hopper 49 and reciprocating feed and pre-load piston 51 to one side of outlet 45 and vibrating piston 53 adjacent to and on the other side of outlet 45. Storage cylinder 43 is equipped with ejection piston 55, nozzle 57 and, desirably, heating coils 59. In operation, with valve 47 closed, cylinder 41 is charged with solid particulate thermoplastic material from hopper 49. Static pressure is applied with piston 51 and the fluctuating pressure is applied by piston 53 until plastication is effected. Valve 47 is then opened and molten thermoplastic material is forced by piston 51 from plastication cylinder 41 into storage cylinder 43. Valve 47 is then closed and the cycle is repeated until sufficient molten material has accumulated in storage cylinder 43 to mold the desired product. The molten material, which, if necessary, has been supplied with sufficient heat to maintain the desired temperature by heating coils 59, is then ejected from cylinder 43 by piston 55 through nozzle 57.

These embodiments, while illustrative of the forms of apparatus which can be made embodying the present invention, obviously do not exhaust all possible alternatives, and still other embodiments will readily occur to one of ordinary skill in the art in light of the present disclosure. For example, the two-stage embodiment of FIG. 3 may be modified whereby heating coils 59 are replaced by a vibrating piston to maintain the temperature of the molten thermoplastic or to raise the temperature to that desired for molding. Alternatively, the thermoplastic material can be rendered molten in cylinder 41 by conventional means, transferred to cylinder 43 and then raised to the desired molding temperature in cylinder 43 by the application of the fluctuating pressure in accordance with this invention. Still other variations will occur to those of ordinary skill in the art.

The static pressure which is applied to the thermoplastic material in accordance with this invention ordinarily will vary depending upon the material employed. In general, however, this pressure should be sufficient to provide close contact of the thermoplastic particles as well as to provide contact between the particles and the vibrating piston. On the other hand, the pressure should not to be so great as to prevent elastic deformation of the thermoplastic material due to the motion of the vibrating piston. With reference to FIG. 4, which is a plot of the pressure exerted by a piston during compression of a charge of granular thermoplastic material in a closed cylinder against the total travel of the piston or piston deflection, it can be seen that initially a small application of pressure results in a large piston deflection. During this phase resistance to the piston is predominantly due to frictional forces and shearing of the solid particles to fill voids between the particles. When the voids have become substantialy filled, i.e., the maximum bulk density of the particulate material is approached, the ratio of the additional increment of piston travel per increment of increased pressure rapidly decreases, and the curve becomes asymptotic to a theoretical maximum deflection. During this latter stage, resistance to the piston travel is due almost entirely to elastic deformation of the contained thermoplastic material. As a general rule, the minimum static pressure which is useful in accordance with this invention is that at which the rate of change of the slope of the curve of FIG. 4 is the greatest, which generally corresponds to the minimum pressure sufficient to compact the particulate material to substantially its maximum bulk density (the specific gravity of the thermoplastic material). As a general rule of thumb, this will ordinarily be the pressure sufficient to produce a deflection of at least 60 percent of the theoretical maximum deflection. The maximum static pressure is dependent upon the material to be processed and ordinarily should not exceed two times the minimum useful static pressure.

As indicated above, heating and plastication of the contained thermoplastic material is effected by superimposing a fluctuating pressure upon the applied static pressure, as by rapidly oscillating a piston in contact with the thermoplastic material whereby the thermoplastic material undergoes rapid reversible elastic deformation. The amplitude of the fluctuating pressure generated in the thermoplastic material cannot be readily measured or determined. However, this parameter is related to piston speed, for without piston motion there can be no heat generated. It has been found that the piston speed should be at least about 20 inches per second, with speeds of at least about 40 inches per second being preferred. Higher speeds can be employed if desired, although speeds of greater than about 100 inches per minute are ordinarily unnecessary. Although the minimum speed required for efficient heating may vary somewhat depending upon the thermoplastic material, and the apparatus employed, it has been found that piston speed is surprisingly unaffected by these and other factors, such as frequency and the like.

In a hydraulic system, such as that illustrated by FIG. 5 and described in detail below, it has been found that, although the amplitude of the fluctuating pressure applied to the thermoplastic material is not readily determinable, the amplitude of the fluctuating hydraulic or driving pressure is readily determinable and controllable, and in such systems fluctuating driving pressure amplitude of from about 2 to about 20 times the static pressure have been found useful.

The frequency of the fluctuating pressure is generally in the sonic range, i.e., 20 to 20,000 cycles per second, although ultrasonic frequencies can be employed if desired. However, for each system there is a frequency, corresponding to the natural resonance frequency of the system, at which the highest efficiency of conversion of mechanical work input to heat is obtained. This frequency will vary depending upon such factors as the thermoplastic material itself, as well as the design of and the materials employed in constructing the plasticator, the vibratory system and associated equipment, and can be readily determined by simple experimentation. Experimental work to date has indicated that the natural resonance frequency normally will fall in the range of from about 100 to about 1000 cycles per second.

The amplitude of the fluctuating driving pressure is not narrowly critical, and normally will be in the range of from about 5 to 20 times the applied static pressure.

The vibrating piston may be actuated in any convenient manner, for example, by the use of generally known mechanical, hydraulic or ultrasonic vibrating devices. A suitable hydraulic system, as shown in FIG. 5, comprises hydraulic system 61, electronic control system 63 and vibrating system 65.

Hydraulic system 61 comprises constant displacement pump 67, pressure relief valve 69, accumulator 71, heat exchanger 73, hydraulic fluid reservoir 75 and connecting lines 77, 79, 81, 83, 85, and 87.

Electronic control system 63 comprises oscillator 89, amplifier 91 and electro-dynamic control 93, such as a solenoid.

Vibratory system 65 comprises servo-valve 95 equipped with spindle 97 having spools 99, 101, and 103 and spring 105; cylinder 107 having reciprocal piston 109 mounted therein and connected through piston rod 111 to vibrating piston 113 of the plasticator of this invention; and hydraulic fluid lines 115 and 117.

In operation hydraulic fluid from reservoir 75 passes through line 77 to pump 67 by which it is discharged into line 79 and then to pressure relief valve 69 which is pre-set to maintain a desired line pressure in line 81. When the pump discharge pressure is greater than the desired line pressure a portion of the hydraulic fluid is diverted through line 83 and returned to reservoir 75. The balance of the hydraulic fluid is fed through line 81 to valve 95. Accumulator 71 is located in line 81 to prevent pressure fluctuations in hydraulic system 61 due to the operation of valve 95. Hydraulic fluid expelled from valve 95 passes through line 85 to heat exchanger 73, where the fluid is cooled, and then through line 87 to reservoir 75.

Spindle 97 of valve 95 is axially vibrated in response to the electrical control system 63. Thus an electrical signal generated by oscillator 89, after amplification in amplifier 91, is transmitted to electro-dynamic control 93, e.g., to the primary coil of a solenoid. The secondary coil of the solenoid is mechanically attached to spindle 97 of valve 95 whereby spindle 97 vibrates in response to the output of oscillator 89.

Hydraulic fluid from line 81 of hydraulic system 61 is introduced into valve 95 and, depending upon the position of spindle 97 and its associated spools 99, 101 and 103, passes either between spools 99 and 101 and out through line 117 or passes between spools 101 and 103 and out through line 115.

On the assumption that spindle 97 is forced to the bottom of valve 95, thereby compressing spring 105, hydraulic fluid passes through line 117 to the right side of piston 109 in cylinder 107, thereby forcing piston 109 to the left and causing a corresponding leftward displacement of vibrating piston 113. Hydraulic fluid in the left side of cylinder 107 is expelled through line 115, passes between spools 101 and 103 of valve 95 and then out through line 85. When solenoid 93 is de-activated, spring 105 forces spindle 97 upward whereby high-pressure fluid from line 81 passes between spools 101 and 103 and then through line 115 to the left side of cylinder 107, thereby urging piston 109 to the right. Fluid expelled from the right side of cylinder 107 passes through line 117 then between spools 99 and 101 and out of valve 95 through line 85.

What is claimed is:

1. In a method for plasticating particulate, solid thermoplastic material, the steps of applying to said material a static pressure sufficient to provide close contact of the particles of said material and simultaneously applying to said material a fluctuating compressive pressure at a frequency at least in the sonic range sufficient to cause reversible elastic deformation of said thermoplastic material, whereby said thermoplastic material is heated.

2. A method according to claim 1 wherein particulate solid thermoplastic material is subjected to a static pressure sufficient to compress said particulate material to about its maximum bulk density.

3. A method according to claim 1 wherein said fluctuating pressure is generated by contacting said thermoplastic material with an oscillating piston having a velocity of at least 20 inches per second.

4. A method according to claim 1 wherein said fluctuating pressure is generated by contacting said thermoplastic material with an oscillating piston having a velocity of at least 40 inches per second.

5. A method according to claim 1 wherein said static pressure is not greater than 2 times the pressure sufficient to provide said maximum bulk density.

6. A method according to claim 4 wherein said frequency is about the natural resonance frequency.

7. A method for the extrusion of thermoplastic materials which comprises charging solid particulate thermoplastic material to a plastication zone, subjecting said particulate material in said zone to a static pressure at least sufficient to provide close contact of the particles thereof and to a fluctuating pressure sufficient to cause reversible elastic deformation of said thermoplastic material for a period of time sufficient to cause plastication of said material, and thereafter discharging molten thermoplastic material from said zone.

8. A method according to claim 7 wherein said static pressure is at least sufficient to compact said particulate material to substantially its maximum bulk density and the frequency of said fluctuating pressure is at least in the sonic range.

9. A method according to claim 8 wherein said fluctuating pressure is generated by contacting said thermoplastic material with an oscillating piston having a velocity of at least 20 inches per second.

10. A method according to claim 8 wherein said fluctuating pressure is generated by contacting said thermoplastic material with an oscillating piston having a velocity of at least 40 inches per second.

11. A method according to claim 8 wherein said thermoplastic material is charged to and discharged from said zone continuously.

12. A method according to claim 8 wherein said thermoplastic material is charged to and discharged from said zone discontinuously.

References Cited

UNITED STATES PATENTS

| 3,239,881 | 3/1966 | Larsen | 264—70 |
| 3,262,154 | 7/1966 | Valyi | 264—176 |
| 3,354,501 | 11/1967 | Bachman et al. | 264—329 |

ROBERT F. WHITE, Primary Examiner

R. H. SHEAR, Assistant Examiner

U.S. Cl. X.R.

264—176, 329, 349